(12) United States Patent
Nakajima et al.

(10) Patent No.: US 11,493,327 B2
(45) Date of Patent: Nov. 8, 2022

(54) LIQUID LAYER THICKNESS MEASUREMENT METHOD, MEASUREMENT DEVICE, FILM PRODUCTION METHOD

(71) Applicant: Toray Industries, Inc., Tokyo (JP)

(72) Inventors: Kenta Nakajima, Otsu (JP); Nobuhiro Naito, Otsu (JP)

(73) Assignee: Toray Industries, Inc., Tokyo (JP)

( * ) Notice: Subject to any disclaimer, the term of this patent is extended or adjusted under 35 U.S.C. 154(b) by 142 days.

(21) Appl. No.: 17/054,826

(22) PCT Filed: May 27, 2019

(86) PCT No.: PCT/JP2019/020843
§ 371 (c)(1),
(2) Date: Nov. 12, 2020

(87) PCT Pub. No.: WO2019/230632
PCT Pub. Date: Dec. 5, 2019

(65) Prior Publication Data
US 2021/0239456 A1  Aug. 5, 2021

(30) Foreign Application Priority Data

May 31, 2018  (JP) .............................. JP2018-104586

(51) Int. Cl.
*G01B 11/06* (2006.01)

(52) U.S. Cl.
CPC .................................... *G01B 11/06* (2013.01)

(58) Field of Classification Search
CPC ..... G01B 11/06; G01B 11/0625; B29C 55/20; B29C 55/16
See application file for complete search history.

(56) References Cited

U.S. PATENT DOCUMENTS

2002/0163652 A1  11/2002  Mikami et al.

FOREIGN PATENT DOCUMENTS

| CN | 107449380 A | * 12/2017 | ........... G01B 17/025 |
|---|---|---|---|
| JP | 02-22952 U1 | 2/1990 | |
| JP | 2002-267417 A | 9/2002 | |
| JP | 2005201634 A | * 7/2005 | |
| JP | 2011-065028 A | 3/2011 | |
| JP | 2012-239975 A | 12/2012 | |
| JP | 2014-25885 A | 2/2014 | |
| JP | 2017-44587 A | 3/2017 | |
| JP | 2017-118049 A | 6/2017 | |
| JP | 2017118049 A | * 6/2017 | ....... H01L 21/02046 |

OTHER PUBLICATIONS

Extended European Search Report dated Jan. 28, 2022, of counterpart European Patent Application No. 19810565.2.
Kondoh et al., "Liquid-sheet jets for terahertz spectroscopy," Optics Express, vol. 22, No. 12, Jun. 2, 2014, in English.

* cited by examiner

*Primary Examiner* — Rebecca C Bryant
(74) *Attorney, Agent, or Firm* — DLA Piper LLP (US)

(57) ABSTRACT

A method of measuring thickness of a liquid layer includes applying a light beam to a liquid layer disposed on a surface of a member, detecting reflected light by a sensor, and analyzing the reflected light according to a spectral interference method with a curve fitting technique to determine the thickness of the liquid layer.

2 Claims, 3 Drawing Sheets

LIQUID LAYER THICKNESS MEASUREMENT METHOD, MEASUREMENT DEVICE, FILM PRODUCTION METHOD

TECHNICAL FIELD

This disclosure relates to a measuring method and a measuring apparatus that measures quantitatively and very accurately the thickness of a liquid layer formed on the surface of a member, and also relates to a film production method that can reduce the dissipation of oil and generation of foreign objects in a tenter apparatus.

BACKGROUND

For apparatuses that have a mechanism containing a plurality of members in contact with each other, it is a common practice to form a liquid layer (oil film in particular) between members to reduce abrasion of the members during operation. If the thickness of the liquid layer is too small in such an instance, it will fail to work effectively in reducing abrasion of the members, leading to acceleration of damage to the apparatus and deterioration in its durability. If on the contrary, the thickness of the liquid layer is too large, the liquid will fly around the members during operation of the apparatus, and if it is a manufacturing apparatus to produce articles, the liquid will adhere to the products, possibly deteriorating their quality. When using such an apparatus, therefore, it is important to measure the thickness of the liquid layer between members in contact with each other to confirm that it is an appropriate range. There have been many studies aiming to develop methods of measuring the thickness of liquid layers.

Known methods proposed to measure the thickness of a liquid layer between members include, for example, a method in which an oil film is formed between a glass ball and a race groove of a race ring provided below the glass ball and irradiated with a light beam, and the thickness of the oil film is determined based on the interference of reflected light (Japanese Unexamined Patent Publication (Kokai) No. 2014-25885) and a method using interference of light in which the film pressure distribution of a lubricant that lubricates contact portions between objects in an elastohydrodynamic lubrication state (EHL state) is determined based on the brightness of reflected light (Japanese Unexamined Patent Publication(Kokai) No. 2017-44587).

The technique described in P '885, however, is useful only for measurement of an oil film thickness between a spherical member such as rolling bearing, and a member having a track groove to accept it, but cannot be applied to measurement of an oil film thickness between members of other shapes. The technique described in JP '587, furthermore, is low in measuring accuracy when the member does not have a very smooth surface and, therefore, can be applied only to limited uses and member shapes.

Thus, it could be helpful to provide a measuring method and a measuring apparatus to measure quantitatively and very accurately the thickness of a liquid layer formed on members of various shapes and to provide a film production method that uses the measuring method.

SUMMARY

We thus provide:
(1) A method of measuring the thickness of a liquid layer including applying a light beam to a liquid layer disposed on the surface of a member, detecting the reflected light by a sensor, and analyzing the reflected light according to a spectral interference method using the curve fitting technique to determine the thickness of the liquid layer.
(2) A method of measuring the thickness of a liquid layer as described in (1), wherein the liquid layer contains a metal component.
(3) A method of measuring the thickness of a liquid layer as described in either (1) or (2), wherein the liquid layer has a thickness of 11 µm or less.
(4) A method of measuring the thickness of a liquid layer as described in any one of (1) to
(3), wherein the member has a surface roughness of 1.0 µm or more and 2.5 µm or less.
(5) A method of measuring the thickness of a liquid layer as described in any one of (1) to (4), wherein the member is a rail on which bearings travel.
(6) A method of measuring the thickness of a liquid layer as described in (5), wherein the rail is a clip rail of a tenter apparatus on which clip devices travel.
(7) A method of measuring the thickness of a liquid layer as described in any one of (1) to (6), wherein the sensor is a portable type sensor.
(8) An apparatus that measures the thickness of a liquid layer by a measuring method as described in any one of (1) to (7) including at least a light exposure means for emitting light toward a liquid layer disposed on the surface of a member, a reflected light detection means for detecting the reflected light coming from the surface of the member and the surface of the liquid layer, an analysis means for measuring the reflectance spectrum based on the detected reflected light, comparing, by the curve fitting technique, the measured reflectance spectrum with a plurality of theoretical reflectance spectra corresponding to different theoretical liquid layer thicknesses set up in advance, identifying the theoretical reflectance spectrum that most closely approximates the measured reflectance spectrum, and deciding on the theoretical liquid layer thickness corresponding thereto as measured liquid layer thickness.
(9) A film production method including a step of stretching a film using a tenter apparatus having a mechanism in which bearings travel on rails and characterized in that a liquid layer meeting Equation (1) is formed on the traveling path of the bearings on each rail wherein h (µm) is the thickness of the liquid layer measured by a measuring method as described in any one of (1) to (7), h1 (µm) being the surface roughness of the rail, and h2 (µm) being the surface roughness of the bearings:

$$2\sqrt{h_1^2+h_2^2} \leq h \leq 10\sqrt{h_1^2+h_2^2} \tag{1}$$

(10) A film production method as described in (9), wherein the thickness h (µm) of the liquid layer is controlled in the range specified by Equation (1) by adjusting the rate of liquid feeding to the traveling path of the bearings.

We provide a measuring method and a measuring apparatus that measures quantitatively and very accurately the thickness of a liquid layer formed on members of various shapes. In addition, generation of defectives due to dissipation of oil and metal powder can be reduced if film production is performed while controlling the thickness of the liquid layer on the clip rails in the tenter apparatus on the basis of measurements taken by using the measuring method and the measuring apparatus.

EXPLANATION OF NUMERALS

Figure 1:
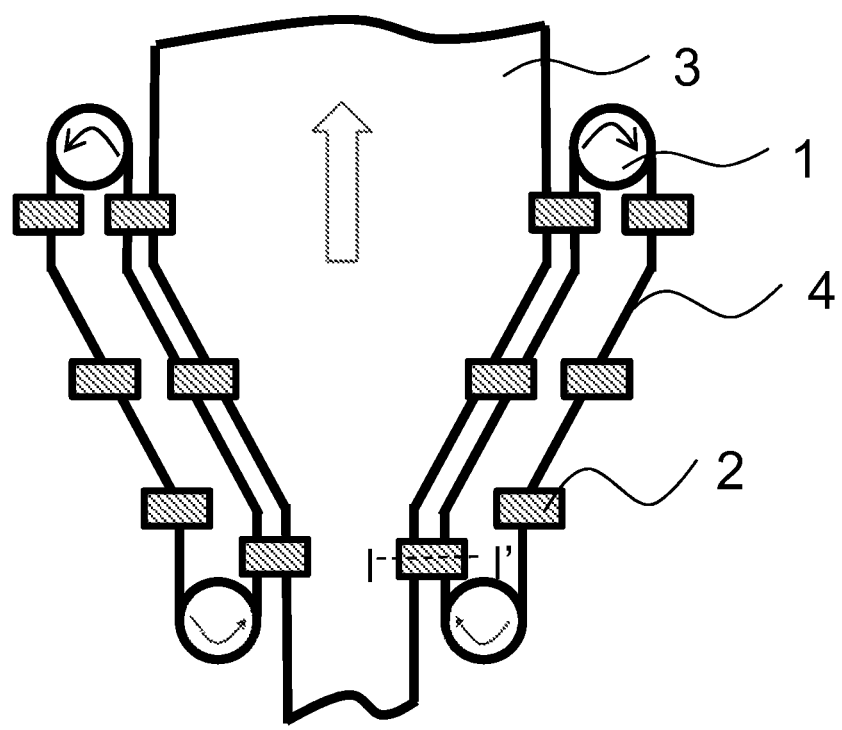
FIG. 1 is a schematic plan view showing a film, clip devices, and clip rails in a tenter apparatus in a typical film production apparatus.

1: sprocket
2: clip device
3: film
4: clip rail
5: clip
6: linkage member
7: bearing
8: liquid layer
11: member
12: liquid layer
13: analysis apparatus main unit
14: sensor
15, 20: optical fiber
16: exposure light beam
17: light exposure means
18, 19: reflected light beam
21: reflected light detection means
22: computer
23: analysis means

DETAILED DESCRIPTION

Our methods and apparatus are described more specifically below.

The method of measuring the thickness of a liquid layer includes applying a light beam to a liquid layer disposed on the surface of a member, detecting the reflected light by a sensor, and analyzing the reflected light according to a spectral interference method using the curve fitting technique to determine the thickness of the liquid layer.

From the viewpoint of convenience and simplicity of measuring, it is important for the measuring method to apply light to the liquid layer disposed on the surface of a member and detect the reflected light by a sensor. Such an examples obtains information on the reflected light required for the undermentioned analysis by the spectral interference method using the curve fitting technique and enables the determination of the thickness of the liquid layer.

A liquid layer as referred to herein is a film formed on a member and is in a liquid state in the operating environment of the member. Specific examples include oil film or water film staying under conditions where the oil or water are in a liquid state. The measuring method can measure a low-transparent liquid layer, which is more difficult to measure and, therefore, the method is advantageous for measuring a thickness of oil film.

There are no particular limitations on the sensor unless desirable effects are impaired, but it is preferably a portable type sensor because measurements can be taken without dismounting or moving the member that carries the liquid layer. Such an example enables the measurement of a liquid layer on a member that is very heavy or large and difficult to dismount such as a clip rail in a tenter apparatus. A portable type sensor as referred to herein is a movable sensor that can detect light. Specific examples of portable type sensors include a built-in type one mounted in an instrument that can be moved freely and a movable one connected to an instrument through a wire or the like and can be moved freely within the range of the length of the wire.

There are no particular limitations on the weight and size of the portable type sensors as long as their bodies are movable, but from the viewpoint of convenience, they are preferably light and small. It is also preferable to adopt a portable type sensor that both emits light for exposure while receiving light from a light source connected through an optical fiber cable and detecting the reflected light. Examples of a measuring apparatus equipped with such a portable type sensor include the noncontact type spectroscopic film thickness measuring system manufactured by Filmetrics (F20 series).

In using a portable type sensor having the two functions of emitting a light beam for exposure and detecting the reflected light as described above, it is preferable that the angle between the exposure light beam and the reflected light beam is as close as possible to 0° to increase the accuracy in reflected light detection to ensure an improved measuring accuracy. Thus, if the surface of the member is flat, it is preferable to emit light perpendicular to the surface of the member, whereas it is curved, it is preferable to emit light perpendicular to the plane tangent to the measuring point.

The incident light used for exposure for the measurement may have an appropriately selected frequency to suit the components of the liquid layer unless desirable effects are impaired. In a liquid layer containing oil as a primary component, for example, it is preferably 0 Hz to 1,000 Hz from the viewpoint of precision of analysis.

There are no particular limitations on the member as long as a liquid layer can be formed on the surface thereof, but it is preferable that there are two or more members that are in friction with each other from the viewpoint of forming a liquid layer such as oil film commonly at a position where a plurality of members are in friction with each other and require reduction in abrasion. Such members include, for example, components of bearings and rails on which bearings travel.

There are no particular limitations on the rail unless desirable effects are impaired, but it is preferably a clip rail in a tenter apparatus. Commonly, a tenter apparatus is used to stretch a film. In this instance, the thickness of the liquid layer on the clip rail in a tenter apparatus has to be maintained at a constant to prevent the quality of the film from being deteriorated by dissipation of powder and dissipation of components of the liquid layer attributed to abrasion of the member. Since the measuring method can measure quantitatively and very accurately the thickness of a liquid layer, a film having a higher quality can be produced by controlling the thickness of the liquid layer on the clip rail in the tenter apparatus based on measurements taken by this method.

Next, the mechanism for stretching a film using a tenter apparatus is described in detail below with reference to drawings. FIG. 1 is a schematic plan view showing a film, clips, and clip rails in a tenter apparatus in a typical film production apparatus. The tenter apparatus in FIG. 1 has a plurality of clip devices 2 conveyed on a chain (not shown in the diagram) driven by two sprockets 1 located at both ends. In the tenter apparatus, the edges at both width-directional ends of the film 3 are griped by clips (shown in FIG. 2) mounted in clip devices 2 that travel on each clip rail 4, and the film 3 gripped by the clips is conveyed in the length direction (arrow direction) in the tenter apparatus as the clip devices 2 travel. In this instance, the film 3 is stretched in the width direction as the distance between the clip rails 4 disposed both sides are increased. Although not shown in FIG. 1, the tenter apparatus may have a preheating zone that preheats the film 3 before the stretching zone, and the stretching zone may be followed by a heat fixation zone that performs heat treatment of the film 3 and a cooling zone that cools the heat-fixed film 3. The width direction is the in-plane direction in the film perpendicular to the length direction.

Figure 2:
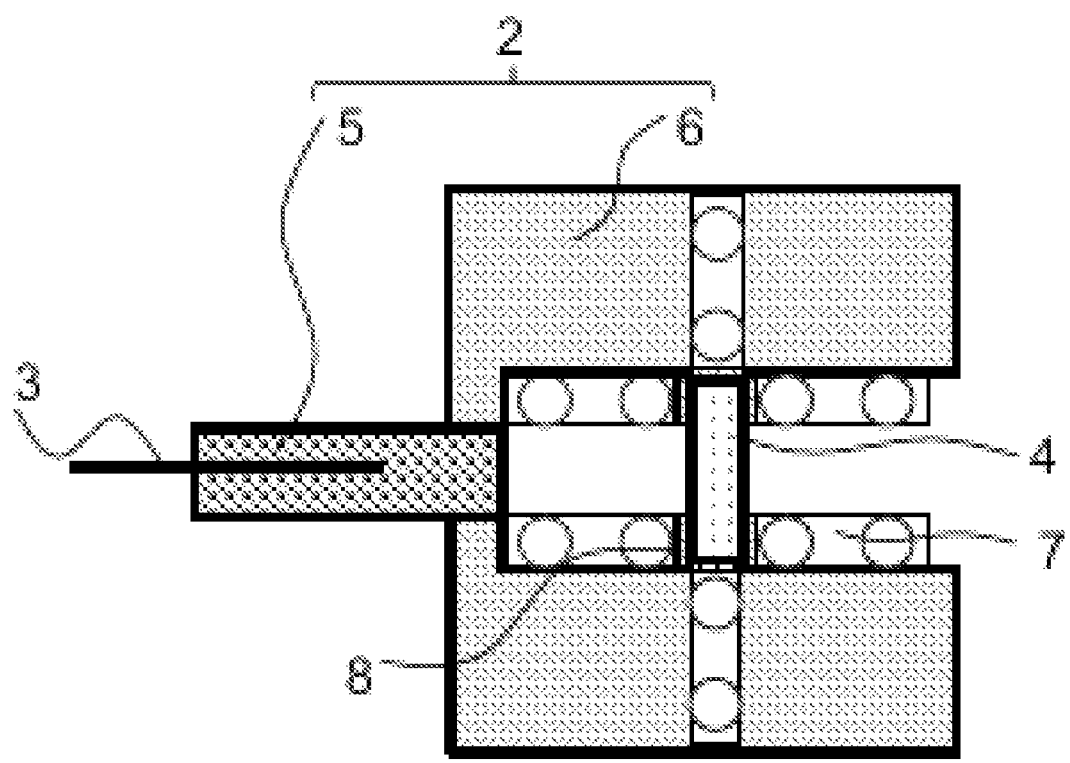
FIG. 2 is an enlarged cross section along the I-I' line in FIG. 1.

Next, the liquid layer located between a clip rail 4 and a clip device 2 in the tenter apparatus is described in detail below with reference to FIG. 2. FIG. 2 is the cross section along the I-I' line in FIG. 1 and shows a clip rail, bearing, and the liquid layer. In FIG. 2, number 5 denotes a clip that grips one of the width-directional ends of the film 3. The clip 5 is mounted on a linkage member 6, and the clip 5 and the linkage member 6 constitute a clip device 2. A plurality of bearings 7 are provided in the linkage member 6, and the plurality of bearings 7 travel on the clip rail 4 to allow the clip device 2 to travel smoothly on the clip rail 4. Then, a liquid layer 8 is formed on the surface of the clip rail 4 to reduce abrasion of the clip rail 4, bearings 7 and the like that can occur as the clip device 2 travels on the clip rail 4 with the clip 5 of the clip device 2 gripping the film 3. In the example given in FIG. 2, one clip device 2 has a total of six bearings 7 located on the left, right, top, and bottom of the clip rail 4 to hold it. The positions and number of the bearings 7 are not limited to the construction described above as long as the clip device 2 can travel smoothly.

As described above, the measuring method can be used to measure the thickness of a liquid layer formed at a position where a plurality of members are in friction with each other. In this example, the liquid layer contains a metal component. There are no particular limitations on the metal component in the liquid layer unless desirable effects are impaired, but it is preferably iron, stainless steel, or a compound thereof from the viewpoint of its frequent use for members such as components of bearings and rails on which bearings travel.

The liquid layer may have an appropriately selected thickness that suites the member on which a liquid layer is to be formed, but when a liquid layer is formed at a position where a plurality of members are in friction with each other, there may be a concern for excess liquid and dissipation thereof. From the viewpoint of reducing the dissipation of liquid, it is preferable for the thickness of the liquid layer to be 11 μm or less, more preferably 5 μm or less. If the thickness of the liquid layer is 11 μm or less, it reduces the dissipation of components of the liquid layer that may occur as a member travels on another member on which the liquid layer is formed. There are no particular limitations on the lower limit of the thickness of the liquid layer unless desirable effects are impaired, but it is about 1 μm in consideration of the detection limit of the measuring apparatus.

There are no particular limitations on the method to be used to form a liquid layer having a thickness of 11 μm or less or in the aforementioned preferable range unless desirable effects are impaired, but, for example, a good method is to calculate the required quantity of the liquid to form a liquid layer having an intended thickness from the area of the portion where the liquid layer is to be formed, drop the liquid on the member, and spread it with a metering bar, i.e., a metal rod wound with a wire, or a brush or the like. When there is a concern for evaporation of a component of the liquid layer as the member is exposed to a high temperature during operation, the quantity of liquid to be dropped may be increased in advance so that the liquid layer will reach an intended thickness during operation, or the thickness of the liquid layer may be measured periodically to allow liquid to be replenished before the liquid quantity decreases excessively. When liquid is to be replenished during operation, liquid may be spread by running the apparatus when it is difficult to spread the liquid with a brush or the like.

When a liquid layer is to be formed using a metering bar, i.e., a metal rod wound with a wire, the thickness of the liquid layer can be adjusted easily by changing the thickness of the wire used to form the metering bar. More specifically, a decrease in the thickness of the wire leads to a decrease in the thickness of the liquid layer.

For the measuring method, it is preferable for the surface roughness of a member to be 1.0 μm or more and 2.5 μm or less. The surface roughness of a member means a surface roughness measured by setting a vertically movable needle so that an end thereof is in contact with the surface of the member and moving it 5 mm along the surface of the member while measuring the size of its up-and-down motion.

In general, the surface roughness of such a member as a component of a bearing or a rail on which a bearing travels is large at the start of use and the surface becomes smooth as a result of abrasion as it is used for a long term. The surface roughness may become less than 1.0 μm in several years. For a member having a surface roughness of 1.0 μm or more, it may be difficult to measure the thickness of the liquid layer on its surface by a generally known method (for example, the method described in JP '587). Specifically, for a member having a surface roughness of 1.0 μm or more, the use of the method is advantageous because the thickness of the liquid layer can be measured easily at a time point when it is difficult to measure it by a generally known method. On the other hand, measurement accuracy improves as the surface roughness of the member decreases to 2.5 μm or less. From the viewpoint described above, it is preferable for the surface roughness of the member to be 1.0 μm or more and 2.0 μm or less.

It is important, from the viewpoint of measuring the thickness of a thin liquid layer very accurately and quantitatively, that the thickness of the liquid layer is determined based on analysis of the reflected light according to a spectral interference method using the curve fitting technique. The curve fitting technique is a method to calculate (determine) the thickness of a film by fitting a measured reflectance spectrum to a theoretical reflectance spectrum that is developed based on calculations according to a film structure recipe (measuring environment, refractive index (n) of the liquid layer, base material used to form the liquid layer, and expected film thickness) set up in advance. More specifically, a plurality of theoretical reflectance spectra are prepared in advance based on calculations according to a plurality of film structure recipes that differ only in expected film thickness, and the theoretical reflectance spectrum that approximates the measured reflectance spectrum most closely is identified. Then, the expected film thickness used in this theoretical reflectance spectrum is adopted as the thickness of the film under measurement. In this instance, the measuring range can be increased by setting a wider range of expected film thickness in film structure recipes, whereas the measurement accuracy can be enhanced by decreasing the increments in expected film thickness in film structure recipes. Furthermore, the spectral interference method is a measuring method designed to apply light to a film and determine the film thickness from the degree of interference of reflected light. Examples of a measuring apparatus intended for analysis by the spectral interference method using the curve fitting technique include the non-contact type spectroscopic film thickness measuring system manufactured by Filmetrics (F20 series).

A reflectance spectrum as referred to herein is a spectrum graph in which the horizontal axis represents wavelength (nm) while the longitudinal axis represents reflectance (%). In general, reflectance spectra vary with film thickness, material type and refractive index of the substance under measurement, material type and surface roughness of the base material and the like. For example, the wave number in a reflectance spectrum tends to increase with an increasing film thickness, and the reflectance of a film tends to increase with an increasing refractive index.

An appropriate range of measuring wavelengths may be set to suit the components, film thickness and the like of the liquid layer under measurement, but it is preferably 190 nm or more and 1,700 nm or less. More specifically, in a thin film, it is preferable to include a low wavelength part of the aforementioned range, whereas in a thick film, the inclusion of a high wavelength part of the aforementioned range ensures an improved measurement accuracy. Preferable examples of light sources to emit light beams of these wavelengths include deuterium lamps for low wavelength ranges of less than 380 nm and halogen lamps for wavelength ranges of 380 nm or more, which may be used in combination to cover all of the aforementioned measuring wavelength ranges.

When the thickness of the liquid layer can be assumed to be in the aforementioned preferable range (1 μm or more and 11 μm or less), it is preferable for the measuring method to cover a measuring wavelength range of 380 nm or more and 1,050 nm or less. When a measuring wavelength range is at a lower limit of 380 nm, it is not necessary to use a deuterium lamp, which serves to reduce the measurement cost, whereas a measuring wavelength range at an upper limit of 1,050 nm, the thickness of the liquid layer in the aforementioned range can be measured with a sufficiently high accuracy.

In addition to the spectral interference method that uses the curve fitting technique, other methods of measuring the thickness of a liquid layer include a method in which laser beams are applied to an oil film to determine the thickness from the optical path difference (laser method), a spectral interference method that uses fast Fourier transformation (FFT method), and an image analysis method in which a plurality of light beams having different wavelengths are applied to a liquid layer to determine a plurality of film thickness distributions from the brightness values of the reflected light beams, although they all have difficulty in measurement of thin liquid layers.

Figure 3:
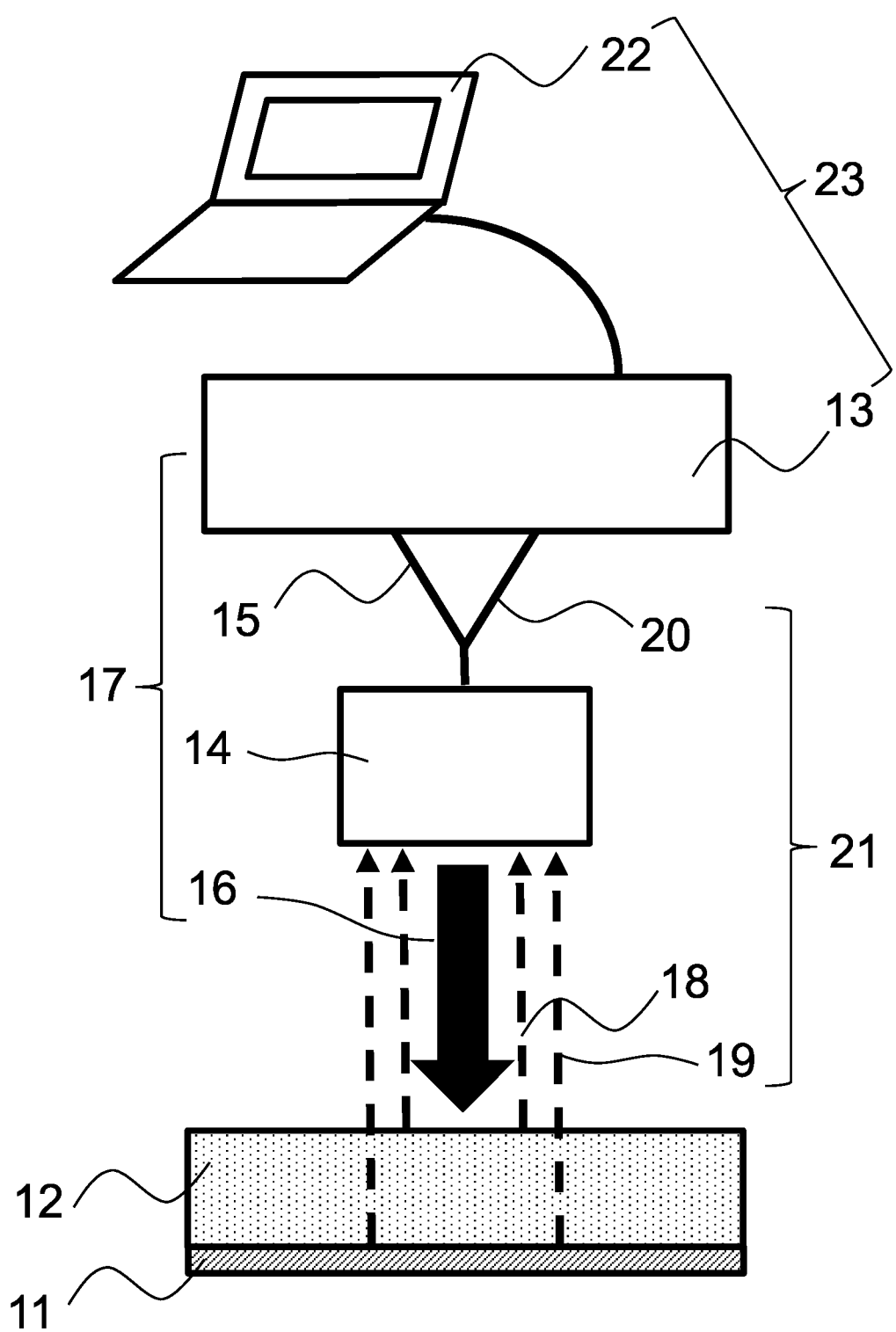
FIG. 3 is a schematic structural diagram of a typical apparatus that measures the thickness of a liquid layer.

Next, described below with reference to FIG. 3 is an example of the liquid layer thickness measuring apparatus that measures the thickness of a liquid layer by the aforementioned measuring method. FIG. 3 shows an example of the thickness measuring apparatus for a liquid layer 12 that measures the thickness of the liquid layer 12 located on the surface of a member 11. The number 13 denotes the main unit of an analysis apparatus that includes at least a light source (not shown) and a spectrometer (not shown), and the number 14 denotes a sensor that includes at least the end of an optical fiber for emitting and detecting a light beam and a lens for adjusting the light exposure area (not shown). A light beam is supplied through an optical fiber 15 connected to the light source contained in the analysis apparatus main unit 13 and adjusted to an exposure area by the lens contained in the sensor 14, thereby providing an exposure light beam 16 emitted toward the liquid layer 12 located on the surface of the member 11. Thus, the light source contained in the analysis apparatus main unit 13, optical fiber 15 connected to the light source, lens contained in the sensor 14, and exposure light beam 16 construct a light exposure means 17.

The reflected light beam 18 from the surface of the liquid layer 12 and the reflected light beam 19 from the surface of the member 11 are received and condensed by the sensor 14 and then sent through the optical fiber 20 to the spectrometer contained in the analysis apparatus main unit 13. Thus, these parts, including the reflected light beams 18 and 19, construct a reflected light detection means 21.

The analysis apparatus main unit 13 is connected to a computer 22 that contains analysis software, and the combination of the analysis apparatus main unit 13 and the computer 22 works to develop a reflectance spectrum based on the reflected light beam detected by the reflected light beam detection means 21. The measured reflectance spectrum is compared, by the curve fitting technique, to a plurality of theoretical reflectance spectra corresponding to different theoretical liquid layer thicknesses set up in advance, thereby making it possible to identify the theoretical reflectance spectrum that most closely approximates the measured reflectance spectrum and decide on the theoretical liquid layer thickness corresponding thereto as measured liquid layer thickness. Thus, the analysis apparatus main unit 13 and the computer 22, including the built-in analysis software, construct an analysis means 23. The measuring method that uses a liquid layer thickness measuring apparatus having such a structure will be described later.

Thus, the measuring apparatus applies a light beam to a liquid layer located on the surface of a member, detects the reflected light by a sensor, and analyzes the reflected light beam by the spectral interference method using the curve fitting technique to determine the thickness of the liquid layer.

Next, the film production method is described below. The film production method is a film production method including a step of stretching a film using a tenter apparatus having a mechanism containing bearings traveling on rails and is characterized in that a liquid layer meeting the Equation (1) is formed on the traveling path of the bearings on each rail wherein h (μm) is the thickness of the liquid layer measured by the measuring method, $h_1$ (μm) being the surface roughness of the rail, and $h_2$ (μm) being the surface roughness of the bearings:

$$2\sqrt{h_1^2+h_2^2} \leq h \leq 10\sqrt{h_1^2+h_2^2} \qquad (1)$$

The film production method is a method of producing a film including a step of stretching a film using a tenter apparatus having a mechanism in which bearings travel on rails. "A step of stretching a film using a tenter apparatus" is a step in which a film is stretched at least in one direction using a tenter apparatus.

Specific examples of known film production techniques useful for the step of stretching a film using a tenter apparatus include a sequential biaxial stretching technique in which an unstretched film is stretched in the length direction using, for example, a roller type longitudinal stretching machine, followed by stretching by the tenter apparatus in the width direction, and a simultaneous biaxial stretching technique in which an unstretched film is stretched simultaneously in the length direction and in the width direction using, for example, a tenter apparatus. The stretching in the length direction by a tenter apparatus is performed commonly by accelerating the clips traveling in the tenter, whereas the stretching in the width direction is performed by gradually increasing the distance between the clips gripping the edges at the width-directional ends of the film.

It is important, from the viewpoint of ensuring improved film quality, that a liquid layer meeting Equation (1) is formed on the traveling path of the bearings on each rail wherein h (μm) is the thickness of the liquid layer measured by the measuring method, $h_1$ (μm) being the surface roughness of the rail, and $h_2$ (μm) being the surface roughness of the bearings. Hereinafter, the thickness h (μm) of the liquid layer measured by the measuring method, the surface roughness $h_1$ (μm) of the rail, and the surface roughness $h_2$ (μm) of the bearings will be occasionally referred to simply as h, $h_1$, and $h_2$, respectively. In this instance, both h and $h_1$ are measured at a position (hereinafter occasionally referred to as measuring point) on the rail 30 cm away in the opposite direction to the traveling direction of the bearings from the liquid feeding point. When there are a plurality of liquid feeding points on the rail, measurements are taken at all positions corresponding to the measuring points and all measurements taken are averaged to represent h and $h_1$. For $h_2$, furthermore, measurements are taken from the bearing of an appropriately selected clip device and the bearings of the two clip devices located on both sides thereof, and the measurements taken are averaged to represent $h_2$. The aforementioned method can be used for measurement of both $h_1$ and $h_2$.

The traveling path of the bearings on each rail means the part of the rail on which the bearings travel when the tenter apparatus is in operation. Specifically, it is the part of the rail that comes in contact with the bearings when the tenter apparatus is operated without a liquid layer.

If the value of h is equal to or higher than the lower limit represented by Equation (1), it reduces abrasion of the bearings and rail and the resulting dissipation of metal in a powdery form. On the other hand, if the value of h is equal to or lower than the upper limit represented by Equation (1), it reduces dissipation of the components of the liquid layer. Specifically, if the value of h is in the range represented by Equation (1), it reduces dissipation of metal powder and the components of the liquid layer, thereby preventing a deterioration in film quality and a decrease in the defective generation rate.

Preheating, stretching, heat treatment, cooling and the like of the film are performed in the tenter apparatus as described later, but the ambient temperature and the strength of air blown at the film differ among them. Furthermore, the traveling speed and acceleration of the clip devices containing bearings may be adjusted to control the extension ratio. In general, with an increasing strength of the air blow hitting the film and with an increasing traveling speed and acceleration of each clip device containing a bearing, the liquid components of the liquid layer on the rail will dissipate more rapidly, leading to more rapid dissipation of metal powder that is cause by abrasion of the bearings and rails.

It is preferable for the film production method to form a liquid layer that meets Equation (2) to reduce their dissipation even under severe conditions such as the above example where the metal powder and components of the liquid layer can dissipate rapidly:

$$2.5\sqrt{h_1^2+h_2^2} \leq h \leq 5\sqrt{h_1^2+h_2^2} \quad (2)$$

It is preferable, from the viewpoint of providing a film having improved quality, that the thickness h (μm) of the liquid layer is controlled in the range specified by Equation (1) by adjusting the rate of liquid feeding to the traveling path of the bearings. Such an example allows easy production of films to be maintained for a long term under conditions where dissipation of metal powder and liquid layer components is suppressed. There are no particular limitations on the means of controlling the thickness h (μm) of the liquid layer unless desirable effects are impaired, but, for example, a good method is to measure the thickness h (μm) of the liquid layer periodically by the measuring method and control the liquid supply rate appropriately on the basis of the measurements.

Next, the film production method is described in detail below with reference to an example where sequential biaxial stretching of polyester resin is performed. However, the following example is only representative of the contents of this disclosure, and our methods and apparatus are not limited thereto.

First, using an extruder, polyester resin is melted and extruded through a nozzle having a slit-like discharge opening to form a sheet, which is then cooled on a cooling roll to provide an unstretched polyester film. Subsequently, this unstretched polyester film is heated to a temperature equal to or higher than the glass transition temperature of the polyester resin by several temperature-controlled rolls, infrared ray heaters or the like, and stretched in the length direction by a series of rolls having different circumferential speeds. There are no particular limitations on the extension ratio in this step unless desirable effects are impaired, but it is preferably 2 to 8. The stretching in the length direction may be carried out in a single stage or may be carried out stepwise in two or more stages.

The uniaxially stretched polyester film thus obtained is then heated (preheat) again by a tenter apparatus up to or above the glass transition temperature of the polyester resin and stretched in the width direction by clip devices containing bearings that travel on rails that gradually diverge from each other. There are no particular limitations on the ratio of extension in the width direction unless desirable effects are impaired, but when the polyester resin is polyethylene terephthalate (hereinafter occasionally referred to as PET), it is preferably 2 to 5.

After stretching in the length direction and width direction, the biaxially stretched polyester film is continued to be heat-treated in the tenter apparatus. When the polyester resin is PET, heat treatment can be performed at a relatively high temperature of 180° C. to 250° C. Such heat treatment serves to improve the dimensional stability of the film in the subsequent processing steps or during use as final product at high temperatures. In addition, dimensional stability can be further improved by relaxing the heat-treated polyester film by 1% to 10% in the length direction and/or width direction.

In the tenter apparatus, a liquid layer meeting Equation (1), preferably a liquid layer meeting Equation (2), is formed on the traveling path of the bearings on each rail wherein h (μm) is the thickness of the liquid layer measured by the measuring method, $h_1$ (μm) being the surface roughness of the rail, and $h_2$ (μm) being the surface roughness of the bearings. If the thickness h (μm) of the liquid layer measured by the measuring method meets Equation (1), it reduces dissipation of metal powder caused by abrasion of the bearings and rails and reduces dissipation of liquid layer components that occurs as the bearings travel on the rails, thus preventing deterioration in film quality from being caused by them.

The heat-treated biaxially stretched polyester film is then cooled in the tenter apparatus and in the subsequent conveyance step and wound up once as an intermediate roll on a broad winder, followed by cutting by a slitter to required width and length to provide a final product.

EXAMPLES

Our methods and apparatus are described in more detail below with reference to Examples. However, this disclosure is not limited to the Examples below.

Liquids for forming liquid layers

Liquid A: mineral lubricating oil, Daphne (registered trademark) Hi-Temp Oil C (manufactured by Idemitsu Kosan Co., Ltd.)

Liquid B: alkyl diphenyl ether oil, Moresco Hilube (registered trademark) LZ-560 (manufactured by Moresco Corporation)

Liquid C: ester oil, Primium Fluid (registered trademark) Special (manufactured by NOK Klüber Co., Ltd.)

Members

Member A: stainless steel clip rail used for two years (surface roughness: 1.1 μm)

Member B: unused stainless steel clip rail (surface roughness: 2.0 μm or more and 2.4 μm or less)

Each member had a flat portion and a liquid layer was formed there.

Metering Bars

Metering bar A: designed so that a liquid layer formed by metering bar has a theoretical thickness value of 2.0 μm Metering bar B: designed so that a liquid layer formed by metering bar has a theoretical thickness value of 4.0 μm Metering bar C: designed so that a liquid layer formed by metering bar has a theoretical thickness value of 11.0 μm Each metering bar was produced by winding a wire around a metal rod. The thickness of the liquid layer formed by metering bar was adjusted by selecting a wire having an appropriate thickness. Hereinafter, the theoretical thickness value of a liquid layer formed by metering bar will be occasionally referred to simply as the theoretical value.

Measurement and Evaluation Methods

Measurements and evaluations described in the Examples were carried out under the conditions specified below.

(1) Formation of Liquid Layer

The surface of each member was cleaned to remove metal powder and the like and a liquid was dropped on the surface of the member. Then, a metering bar, i.e., a metal rod having a wire wound around it, was pressed against a rail and the liquid was spread to form a liquid layer over the surface of the member.

(2) Thickness of Liquid Layer (2-A) Spectral Interference Method using Curve Fitting Technique (the Method used in the Examples)

Measurements were performed by the following procedure using a noncontact type spectroscopic film thickness measuring system (F20, manufactured by Filmetrics). First, eight film structure recipes that differ only in expected film thickness were set up as described below and a theoretical reflectance spectrum was developed for each of them by the computing function contained in the apparatus (hereinafter, a reflectance spectrum developed in this way will be occasionally referred to as a theoretical reflectance spectrum). Then, a light beam was applied to the liquid layer and the reflected light beam was detected by a portable type sensor to obtain a reflectance spectrum (hereinafter, a reflectance spectrum obtain in this way will be occasionally referred to as a measured reflectance spectrum). Subsequently, using the analysis software described below, each theoretical reflectance spectrum and the measured reflectance spectrum were displayed on the screen of a computer and the measured reflectance spectrum and each theoretical reflectance spectrum were compared by the curve fitting technique to identify the theoretical reflectance spectrum that approximates the measured reflectance spectrum most closely. Then, a film thickness expected from the identified theoretical reflectance spectrum (theoretical liquid layer thickness corresponding to the theoretical reflectance spectrum) was adopted as the thickness of the liquid layer under measurement. The measuring conditions used above were as described below. Three measurements were taken in each Example and Comparative Example and their average was adopted as measured thickness of the liquid layer (if no measurement was obtained in three measuring runs, it was judged to be "not measurable").

Film Structure Recipe

Measuring environment (Layer, Medium): air

Liquid layer and refractive index (n) (Layer, 1): Generic, n=1.5

Base material used to form the liquid layer (Layer, Substrate): stainless steel

Expected film thickness: Any film thickness value can be set in the ranges of 2 μm±50%, 3 μm±50%, 4 μm±50%, 5 μm±50%, 6 μm±50%, 8 μm±50%, 10 μm±50%, and 11 μm±50%.

For the Examples, however, eight expected film thicknesses of 2 μm, 3 μm, 4 μm, 5 μm, 6 μm, 8 μm, 10 μm, and 11 μm were set up in film structure recipes, and a theoretical reflectance spectrum was developed to represent each of the film thicknesses. Thus, such theoretical reflectance spectra and theoretical film thicknesses corresponding to them (expected film thicknesses) were set up in advance. When film thickness measurements of higher accuracy are desired, it is recommended as follows: a theoretical reflectance spectrum that approximates the measured reflectance spectrum most closely is identified in the film structure recipes, and a film thickness expected from the identified theoretical reflectance spectrum is identified, followed by developing more detailed film thickness recipes around the identified expected film thickness and performing analysis by the curve fitting technique as in the above example (for example, if the identified expected film thickness is 4 μm, the film thicknesses of 3.8, 3.9, 4.0, 4.1, 4.2, . . . μm and film structure recipes for theoretical reflectance spectra corresponding to them are set up, and from among them, a theoretical reflectance spectrum that approximates the measured reflectance spectrum most closely is identified, followed by adopting the expected film thickness assumed in this identified theoretical reflectance spectrum as the thickness of the film under measurement).

Measuring Conditions

Measuring wavelength range: 380 nm to 1,050 nm

Distance between sensor head and surface of member: 200 mm

Angle between surface of member and exposure light beam: 90°

Analysis software and mode: FIL Measure, film thickness measuring mode (2-B) Spectral Interference Method using FFT Technique (the Method used in Comparative Examples)

A light beam was applied to a liquid layer and the reflected light was detected by a portable type sensor, followed by analyzing the reflected light beam by the spectral interference method using the FFT technique. The measuring instrument and measuring conditions used were as described below. Three measurements were taken in each Comparative Example and their average was adopted as measured thickness of the liquid layer (if no measurement was obtained in three measuring runs, it was judged to be "not measurable").

Measuring Instrument

Measuring instrument: spectral interference displacement type multilayer film thickness measuring instrument (SI-T80, manufactured by Keyence Corporation)

Measuring Conditions

Distance between sensor head and surface of member: 80 mm

Angle between surface of member and exposure light beam: 90°

(2-C) Image Processing Method (the Method Used in Comparative Examples)

Three light beams having different wavelengths were applied to a liquid layer and a plurality of film thickness distributions were estimated from the brightness values of the reflected light beams and used for determination. The measuring instrument and measuring conditions used were as described below. Three measurements were taken in each Comparative Example and their average was adopted as measured thickness of the liquid layer (if no measurement was obtained in three measuring runs, it was judged to be "not measurable").

Measuring Instrument

Measuring instrument: surface profile measuring device, SP700-500 (manufactured by Toray Engineering Co., Ltd.)

Camera: three wavelength type multiband pass filter camera, acA640-90 uc (7.4 µm/pix, 640×480 pix, manufactured by Basler)

Measuring Conditions

Objective lens: 10×

Field size: 0.47×0.36

(3) Measurement Accuracy

The measured value obtained by each method described in "(2) Thickness of liquid layer" was divided by the theoretical value described in "(1) Formation of liquid layer" and the quotient (hereinafter occasionally referred to as "measured value/theoretical value") was used for evaluation according to the criteria given below. Only the films rated as A were judged to be acceptable. A "measured value/theoretical value" ratio closer to 1.0 means a higher measurement accuracy.

A: The "measured value/theoretical value" ratio is 0.70 or more and 1.30 or less.
B: The "measured value/theoretical value" ratio is outside the above range or the film is not measurable.

(4) Surface Roughness

Using a small surface roughness measuring device (product number: SJ-210, manufactured by Mitutoyo Corporation), a total of three surface roughness measurements were taken from the bearing traveling path on each member, and the average was adopted to represent the surface roughness (µm) of the member.

(5) Existence/Absence of Dissipation of Metal Powder

A piece of nonwoven fabric was attached at the outlet of the tenter apparatus such that it came in contact with the surface of the traveling film, and the nonwoven fabric was visually observed in 8 hours after the start of production. Existence/absence of dissipation of metal powder was evaluated according to the criteria given below, and only the films rated as A were judged to be acceptable.

A: Metal powder was not found attached on the surface of the nonwoven fabric.

B: Metal powder was found attached on the surface of the nonwoven fabric.

(6) Existence/Absence of Dissipation of Liquid Layer Components

A 100 m portion of the film was wound off from the resulting final roll product and cut off for use as sample. The resulting sample was visually observed under a fluorescent lamp and existence/absence of dissipation of liquid layer components was evaluated according to the criteria given below. The evaluation was performed on the final product obtained in 2 hours after the start of production, and only the samples rated as A were judged to be acceptable.

A: Liquid layer components were not found attached.
B: Liquid layer components were found attached.

Measurement of Thickness of Liquid Layer

Examples and Comparative Examples of measurements of the thickness of liquid layers are below.

Example 1

The surface of each member was cleaned in advance to remove metal powder and the like and the liquid A was dropped on the surface of the member A. Then, the metering bar was pressed and the liquid was spread to form a liquid layer over the surface of the member. Subsequently, its thickness was measured according to the method described in "(2-A) Spectral interference method using curve fitting technique" in "(2) Thickness of liquid layer," and the measurement accuracy was evaluated according to the method described in "(3) Measurement accuracy." Evaluation results are in Table 1.

Examples 2 to 10

Except for adopting a member, liquid, metering bar, and theoretical liquid layer thickness (µm) as given in Table 1, the same procedure as in Example 1 was carried out. Results are in Table 1.

Comparative Example 1

A liquid layer was formed as in Example 2, and its thickness was measured according to the method described in "(2-C) Image processing method" in "(2) Thickness of liquid layer," but it was impossible to obtain measurements (Table 1).

Comparative Example 2

A liquid layer was formed as in Example 10, and its thickness was measured according to the method described in "(2-C) Image processing method" in "(2) Thickness of liquid layer," but it was impossible to obtain measurements (Table 1).

TABLE 1

| | Member | Liquid | Metering bar | Theoretical liquid layer thickness (µm) | Measurement (µm) | Measuring method | Measurement accuracy |
|---|---|---|---|---|---|---|---|
| Example 1 | A | A | A | 2.0 | 2.4 | curve fitting | A |
| Example 2 | A | A | B | 4.0 | 4.4 | curve fitting | A |
| Example 3 | A | A | C | 11.0 | 10.6 | curve fitting | A |
| Example 4 | A | B | A | 2.0 | 2.6 | curve fitting | A |
| Example 5 | A | B | B | 4.0 | 4.0 | curve fitting | A |

TABLE 1-continued

| | Member | Liquid | Metering bar | Theoretical liquid layer thickness (μm) | Measurement (μm) | Measuring method | Measurement accuracy |
|---|---|---|---|---|---|---|---|
| Example 6 | A | B | C | 11.0 | 11.4 | curve fitting | A |
| Example 7 | A | C | A | 2.0 | 2.5 | curve fitting | A |
| Example 8 | A | C | B | 4.0 | 4.1 | curve fitting | A |
| Example 9 | A | C | C | 11.0 | 10.4 | curve fitting | A |
| Example 10 | B | A | B | 4.0 | 4.2 | curve fitting | A |
| Comparative Example 1 | A | A | B | 4.0 | not measurable | image processing | B |
| Comparative Example 2 | B | A | B | 4.0 | not measurable | image processing | B |

Film Production Method

The film production methods used in the Examples and Comparative Examples are described below. Regarding the film production methods used here, the Comparative Examples include not only one in which our measuring method was not used to measure the thickness of the liquid layer on the clip rails in the tenter apparatus (Comparative Example 3), but also others in which the thickness of the liquid layer measured by our measuring method was outside the range specified by Equation (1) (Comparative Examples 4 and 5):

$$2\sqrt{h_1^2 + h_2^2} \leq h \leq 10\sqrt{h_1^2 + h_2^2} \quad (1)$$

Example 11 and Comparative Example 3

PET pellets were sufficiently vacuum-dried first, fed to an extruder, melted at 270° C. to 300° C., and then extruded through a T-die to form a sheet. The extruded sheet was allowed to wind around a casting drum having a surface temperature of 20° C. to 25° C. by electrostatic casting so that it was cooled and solidified to provide an unstretched film. Using a roll type stretching machine, this unstretched film was heated up to 80° C. to 100° C. and stretched by two times in the length direction to provide a uniaxially stretched film. Subsequently, this uniaxial stretched film, with the width-directional ends held by clips traveling on clip rails, is introduced into the preheating zone of the tenter apparatus (ambient temperature 120° C. to 130° C.). After preheating in the preheating zone, the film was stretched by three times in the width direction in a stretching zone at 140° C., heat-treated in a heat treatment zone at 230° C., and cooled to 40° C. to 50° C. to provide a biaxially stretched film having a thickness of 188 The resulting biaxially stretched film was wound up once as an intermediate roll, and then the film was wound off from the intermediate roll, cut by a slitter, and wound up again to provide a film roll having a width of 100 cm.

During the film production, the thickness of the liquid layer on the clip rails in the tenter apparatus was measured by the method described in "(2-A) Spectral interference method using curve fitting technique" (Example 11) or by the method described in "(2-B) Spectral interference method using FFT technique" (Comparative Example 3) in "(2) Thickness of liquid layer." In these examples, the member A was used as clip rails and the liquid A was used as liquid for forming the film. The supply rate of the liquid was controlled so that the thickness of the liquid layer was 5 Each of the clip rails had one liquid feeding point where the liquid was supplied to the clip rail and the thickness of the liquid layer was measured at a position 30 cm away in the opposite direction to the traveling direction of the bearings from the liquid feeding point. The measurement in Example 11 was 5 μm (confirming that the liquid layer had a desired thickness), whereas in Comparative Example 3, no measurements were obtained in three measuring runs (Table 2).

TABLE 2

| | Member | Liquid | Measured liquid layer thickness (μm) | Measuring method |
|---|---|---|---|---|
| Example 11 | A | A | 5 | curve fitting |
| Comparative Example 3 | A | A | not measurable | FFT |

Examples 12 and 13 and Comparative Examples 4 and 5

Except that a liquid layer having a thickness as shown in Table 3 was formed by adjusting the liquid feeding rate, the same procedure as in the section "Example 11 and Comparative Example 3" was carried out to prepare a film and it was evaluated in terms of existence/absence of dissipation of metal powder and existence/absence of dissipation of liquid layer components. Evaluation results are in Table 3. The adjustment of the liquid feeding rate was performed by stepwise control of the rotating speed of the oil feeding gear pump while measuring the thickness of the liquid layer on the rails on which bearings travel in the tenter apparatus according to the method described in "(2-A) Spectral interference method using curve fitting technique."

TABLE 3

| | Member | Liquid | Measured liquid layer thickness (μm) | Dissipation of metal powder | Dissipation of liquid layer component |
|---|---|---|---|---|---|
| Example 12 | A | A | $3.0\sqrt{h_1^2 + h_2^2}$ | A | A |
| Example 13 | A | A | $5.0\sqrt{h_1^2 + h_2^2}$ | A | A |
| Comparative Example 4 | A | A | $<2.0\sqrt{h_1^2 + h_2^2}$ | B | A |

TABLE 3-continued

|  | Member | Liquid | Measured liquid layer thickness (μm) | Dissipation of metal powder | Dissipation of liquid layer component |
|---|---|---|---|---|---|
| Comparative Example 5 | A | A | $>10.0\sqrt{h_1^2+h_2^2}$ | A | B |

INDUSTRIAL APPLICABILITY

We provide a measuring method and a measuring apparatus that measures quantitatively and very accurately the thickness of a liquid layer formed on members of various shapes. In addition, generation of defectives due to dissipation of oil and metal powder can be reduced if film production is performed while controlling the thickness of the liquid layer on the clip rails in the tenter apparatus on the basis of measurements taken by using the measuring method and the measuring apparatus.

The invention claimed is:

1. A method of producing a film comprising a step of stretching the film with a tenter apparatus having a mechanism in which bearings travel on rails, wherein a liquid layer satisfying Equation (1) is formed on a traveling path of the bearings on each rail wherein h (μm) is the thickness of the liquid layer measured by a method of measuring thickness of a liquid layer comprising applying a light beam to a liquid layer disposed on a surface of a member, detecting reflected light by a sensor, and analyzing the reflected light according to a spectral interference method with a curve fitting technique to determine the thickness of the liquid layer, wherein $h_1$ (μm) is the surface roughness of the rail, and $h_2$ (μm) is the surface roughness of the bearings:

$$2\sqrt{h_1^2+h_2^2} \leq h \leq 10\sqrt{h_1^2+h_2^2} \quad (1).$$

2. The method as set forth in claim 1, wherein the thickness h (μm) of the liquid layer is controlled by Equation (1) by adjusting a rate of liquid feeding to the traveling path of the bearings.

* * * * *